UNITED STATES PATENT OFFICE.

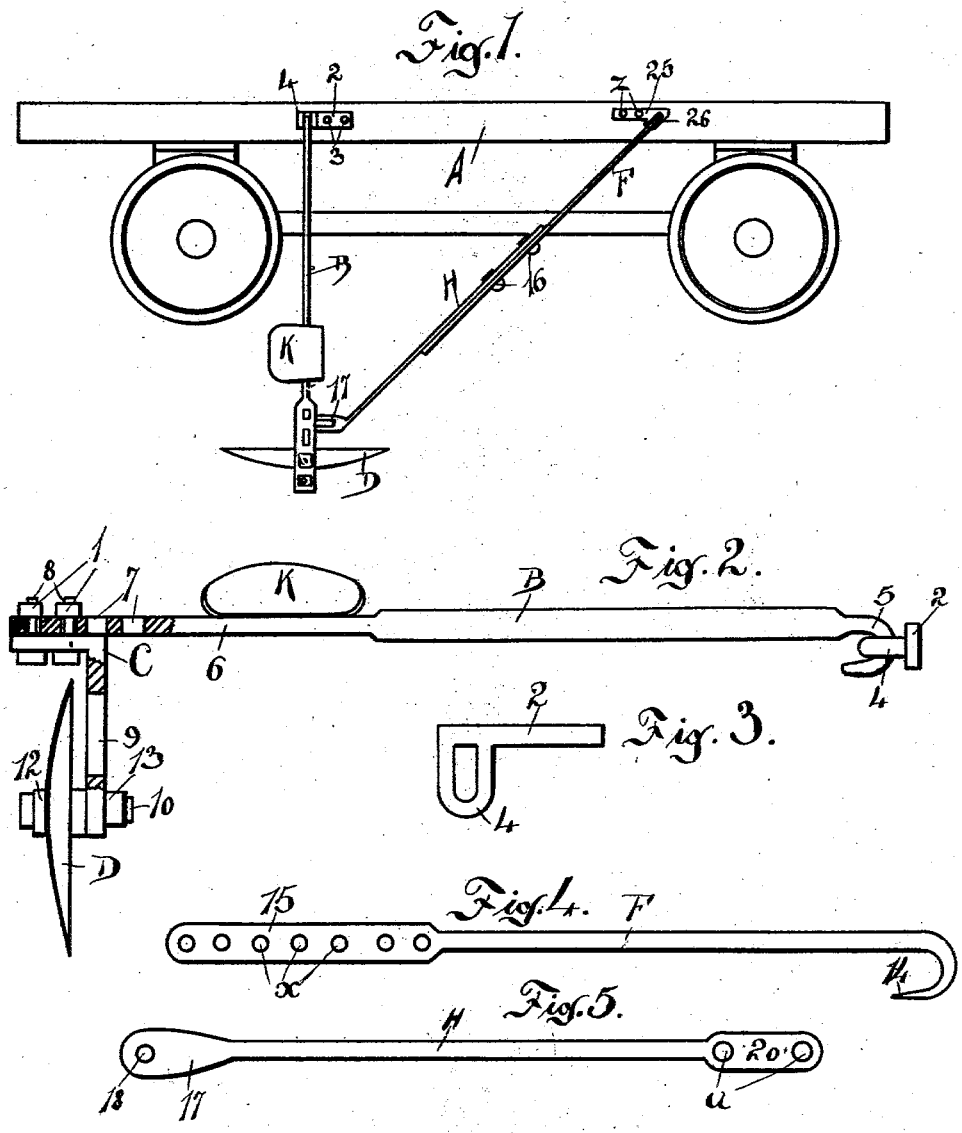

ANSELM A. ELDER, OF PORTSMOUTH, IOWA.

LAND-MARKER.

SPECIFICATION forming part of Letters Patent No. 717,825, dated January 6, 1903.

Application filed October 7, 1901. Serial No. 77,831. (No model.)

*To all whom it may concern:*

Be it known that I, ANSELM A. ELDER, residing at Portsmouth, in the county of Shelby and State of Iowa, have invented certain useful Improvements in Land-Markers; and I do hereby declare that the following is a full, clear, and exact description of the invention, such as will enable others skilled in the art to which it appertains to make and use the same, reference being had to the accompanying drawings, which form a part of this specification.

This invention relates to an improved land-marker.

The object of my invention is to provide a simple device which may be attached to a hand-car or other vehicle to be dragged along to provide a cut within a railroad right of way to show how far out the weeds and grass are to be cut to provide a sightly roadway and prevent fire adjacent the rails.

In the accompanying drawings, Figure 1 is a side or edge elevation of a railway-car with my land-marker as depended from the same. Fig. 2 shows a part-sectional elevation disclosing the manner in which the cutter is secured to the cutter-bar. Fig. 3 shows a detail of the cutter-bar-holding ear, while Figs. 4 and 5 show detached details of the two drag-bars as used in my invention.

As has been set forth, the object of my invention is to provide a device which may be adjustably secured to a car to be dragged along and adjacent the rails to cut the grass and earth to provide a mark showing how far out the section-hands are to cut the grass and weeds.

In fulfilling the aim of my invention I provide a suitable car A with an ear, comprising the base-plate 2, from which extends the ear 4 proper, as is shown in Fig. 3. At a suitable point I provide a second ear, comprising the base-plate 25, from which extends the ear 26, this ear being held by means of the screws $z$, the ear 4 being held by means of the screws 3. Hooked within the ear 4 by means of the hook 5 is a supporting-bar B, which has one end flattened, as is shown at 6, and provided with a number of openings 7, through which extend a number of bolts 8, provided with the nuts 1, which are used to adjustably secure the L-shaped bracket C, through which the bolts pass, as shown more clearly in Fig. 2. This bracket C is provided below with an opening, through which extends the bolt 10, provided with a washer 12, and to which bolt is revolubly secured the cutter-disk D by means of the nut 13. This bracket C is provided with a slot 9, through which passes a suitable bolt, which in turn passes through the bifurcated end 17 of the drag-bar member H, as is shown in Figs. 1 and 5. This drag-bar H has its bifurcated end 17 provided with an opening 18, through which extends a suitable bolt. The opposite end 20 of this drag member H is provided with the openings $a$, through which extend the bolts 16, as is shown in Fig. 1. The remaining drag-bar member F is hook-ended, being provided with the hook 14, while the opposite end 15 is flattened and provided with a plurality of openings $x$, so that these drag-bar members H and F may be suitably secured. To the ear 26 is secured the hook 14, while the ear 4 is adapted to receive the hook 5, so that the bar B and the two-part drag-bar H F are both hooked to the car, as shown.

The bar B is provided at a suitable point with a seat K, upon which the operator may sit.

In being dragged along the cutter D follows the irregularities of the earth, thus providing a well-pronounced cut, and in using a disk cutter, as is shown at D, a well-defined furrow, as well as a ridge, is provided.

The disk may be adjusted by means of the bracket C, and the disk may be inclined or adjusted radially by means of the two-part drag-bars H and F, so that a narrow or a wide groove may be cut, depending upon the angle at which the disk D is set.

The device is simple of adjustment and in case of encountering a gulley or bridge may be thrown upward, being hooked within the ears, or be almost instantly detached from the ears and be carried upon the car.

Having thus described my said invention, what I claim as new, and desire to secure by United States Letters Patent, is—

A device of the class described, comprising a supporting-bar having at one end a hook for pivotal attachment to a suitable hand-car and its other end flattened and provided with a longitudinal series of openings, an L-shaped bracket connected to the under side of said bar, fastening devices carried by said bracket and fitting in the openings of the supporting-bar for attaching the bracket to said bar, whereby said bracket may be adjusted at different points longitudinally of said bar, a cutter-disk carried by said bracket for marking the ground, a sectional drag-bar extending in advance of said supporting-bar and connected at one end to said L-shaped bracket and at its other end to the car, the contiguous ends of the sections of said drag-bar being flattened and overlapping, and each provided with a series of openings, and fastening devices passing through said openings for securing said sections together, said sections being also adjustable upon each other for lengthening or shortening the drag-bar and thereby adjusting the inclination of the cutter-disk relatively to the car for regulating the size of the furrow made by the disk.

In testimony whereof I have signed my name to this specification in the presence of two witnesses.

ANSELM A. ELDER.

Witnesses:
 ALBERT C. WALKER,
 GEO. H. SIMS.